US011869489B2

(12) United States Patent
Aggarwal et al.

(10) Patent No.: US 11,869,489 B2
(45) Date of Patent: *Jan. 9, 2024

(54) PROVIDING SUGGESTED VOICE-BASED ACTION QUERIES

(71) Applicant: Google LLC, Mountain View, CA (US)

(72) Inventors: Vikram Aggarwal, Palo Alto, CA (US); Pravir Kumar Gupta, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,450

(22) Filed: Jan. 28, 2022

(65) Prior Publication Data

US 2022/0157302 A1 May 19, 2022

Related U.S. Application Data

(63) Continuation of application No. 16/586,612, filed on Sep. 27, 2019, now Pat. No. 11,238,851, which is a
(Continued)

(51) Int. Cl.
*G06F 16/33* (2019.01)
*G10L 15/18* (2013.01)
(Continued)

(52) U.S. Cl.
CPC .......... *G10L 15/1822* (2013.01); *G06F 3/167* (2013.01); *G06F 16/3322* (2019.01);
(Continued)

(58) Field of Classification Search
CPC ................. G10L 15/1822; G10L 15/26; G10L 2015/223; G10L 17/22; G06F 3/167;
(Continued)

(56) References Cited

U.S. PATENT DOCUMENTS 7,657,493 B2  2/2010  Meijer
8,473,289 B2  6/2013  Jitkoff et al.
(Continued)

FOREIGN PATENT DOCUMENTS

CN   101213511   7/2008
CN   102272828   12/2011
(Continued)

OTHER PUBLICATIONS

Japanese Patent Office; Notice of Allowance issued in Application No. 2020-091323; 3 pages; dated Nov. 15, 2021.
(Continued)

*Primary Examiner* — Apu M Mofiz
*Assistant Examiner* — Cindy Nguyen
(74) *Attorney, Agent, or Firm* — Gray Ice Higdon

(57) ABSTRACT

Technology of the disclosure may facilitate user discovery of various voice-based action queries that can be spoken to initiate computer-based actions, such as voice-based action queries that can be provided as spoken input to a computing device to initiate computer-based actions that are particularized to content being viewed or otherwise consumed by the user on the computing device. Some implementations are generally directed to determining, in view of content recently viewed by a user on a computing device, at least one suggested voice-based action query for presentation via the computing device. Some implementations are additionally or alternatively generally directed to receiving at least one suggested voice-based action query at a computing device and providing the suggested voice-based action query as a suggestion in response to input to initiate providing of a voice-based query via the computing device.

15 Claims, 11 Drawing Sheets

Related U.S. Application Data continuation of application No. 14/808,919, filed on Jul. 24, 2015, now Pat. No. 10,504,509.

(60) Provisional application No. 62/167,195, filed on May 27, 2015.

(51) Int. Cl.
*G06F 3/16* (2006.01)
*G10L 15/26* (2006.01)
*G06F 16/332* (2019.01)
*G10L 15/22* (2006.01)

(52) U.S. Cl.
CPC .......... *G06F 16/3323* (2019.01); *G10L 15/26* (2013.01); *G10L 2015/223* (2013.01)

(58) Field of Classification Search
CPC .............. G06F 16/3322; G06F 16/3323; G06F 16/2428; G06F 16/24522; G06F 16/3334
See application file for complete search history.

(56) References Cited

U.S. PATENT DOCUMENTS

| | | |
|---|---|---|
| 8,543,397 B1 | 9/2013 | Nguyen |
| 8,650,210 B1 | 2/2014 | Cheng et al. |
| 8,697,822 B2 | 4/2014 | Durali et al. |
| 8,849,675 B1 | 9/2014 | Foerster et al. |
| 8,930,393 B1 | 1/2015 | Nordstrom et al. |
| 8,990,079 B1 | 3/2015 | Newman |
| 9,378,740 B1 | 6/2016 | Rosen et al. |
| 10,504,509 B2 | 12/2019 | Aggarwal et al. |
| 11,238,851 B2 | 2/2022 | Aggarwal et al. |
| 2005/0054381 A1 | 3/2005 | Lee et al. |
| 2008/0243501 A1 | 10/2008 | Hafsteinsson et al. |
| 2008/0247519 A1 | 10/2008 | Abella et al. |
| 2009/0150155 A1 | 6/2009 | Endo et al. |
| 2010/0121636 A1 | 5/2010 | Burke et al. |
| 2011/0307253 A1 | 12/2011 | Lloyd et al. |
| 2012/0016678 A1 | 1/2012 | Gruber et al. |
| 2012/0035931 A1* | 2/2012 | LeBeau .................. H04W 4/046 704/E15.005 |
| 2012/0084292 A1 | 4/2012 | Liang et al. |
| 2012/0084312 A1 | 4/2012 | Jenson |
| 2013/0066634 A1* | 3/2013 | Soliman ................ G06F 16/337 704/270.1 |
| 2013/0091463 A1 | 4/2013 | Nordstrom et al. |
| 2013/0179173 A1 | 7/2013 | Lee et al. |
| 2013/0325839 A1 | 12/2013 | Goddard et al. |
| 2013/0346450 A1 | 12/2013 | Procopio et al. |
| 2014/0039895 A1* | 2/2014 | Aravamudan ....... G10L 15/1822 704/257 |
| 2014/0046891 A1 | 2/2014 | Banas |
| 2014/0053088 A1 | 2/2014 | Civelli et al. |
| 2014/0081633 A1 | 3/2014 | Badaskar |
| 2014/0122059 A1 | 5/2014 | Patel et al. |
| 2014/0196092 A1 | 7/2014 | Chung et al. |
| 2014/0222436 A1 | 8/2014 | Binder et al. |
| 2014/0278435 A1 | 9/2014 | Ganong, III et al. |
| 2014/0280289 A1 | 9/2014 | Marantz et al. |
| 2014/0334645 A1 | 11/2014 | Yun et al. |
| 2015/0006564 A1 | 1/2015 | Tomkins et al. |
| 2015/0254057 A1* | 9/2015 | Klein .................. H04N 21/4668 704/275 |
| 2015/0382047 A1 | 12/2015 | Van Os et al. |

FOREIGN PATENT DOCUMENTS

| | | |
|---|---|---|
| CN | 102439661 | 5/2012 |
| CN | 102792320 | 11/2012 |
| CN | 102792664 | 11/2012 |
| CN | 102915342 | 2/2013 |
| CN | 103425727 | 12/2013 |
| CN | 103443853 | 12/2013 |
| CN | 103729126 | 4/2014 |
| EP | 3262636 | 1/2018 |
| JP | 2000244609 | 9/2000 |
| JP | 2002259114 | 9/2002 |
| JP | 2002278591 | 9/2002 |
| JP | 2004258233 | 9/2004 |
| JP | 2004272363 | 9/2004 |
| JP | 2004334228 | 11/2004 |
| JP | 2007508590 | 4/2007 |
| JP | 2012230191 | 11/2012 |
| JP | 2014134675 | 7/2014 |
| JP | 2014203207 | 10/2014 |
| KR | 1020140028540 | 3/2011 |
| KR | 1020120125377 | 11/2012 |
| TW | 200710823 | 3/2007 |
| WO | 2013122840 | 8/2013 |
| WO | 2016073803 | 5/2016 |

OTHER PUBLICATIONS

Intellectual Property of India; Hearing Notice issued in Application No. 201747034057; 3 pages, dated Aug. 18, 2021.
Japanese Patent Office; Notice of Reasons for Rejection issued in Application No. 2020-091323; 6 pages; dated Apr. 26, 2021.
Korean Intellectual Property Office; Notice of Office Action issued in Application No. 10-2019-7030804; 11 pages; dated Jun. 10, 2021.
European Patent Office, Intention to Grant European Patent for Application No. 18179479.3; 48 pages; dated Jun. 25, 2020.
Intellectual Property Office; Intention to Grant issued in British Application GB1715688.6; 2 pages; dated Jul. 14, 2020.
Japanese Patent Office; Notice of Allowance issue in JP Application No. 2018-212055; 3 pages; dated Apr. 27, 2020.
Intellectual Property Office; Examination Report issued in British Application GB1715688.6; 5 pages; dated Mar. 13, 2020.
Intellectual Property India; Examination Report issued in Application 201747034057 dated Feb. 14, 2020 (6 Pages).
Korean Intellectual Property Office; Office Action issued in Application No. 10-2018-7017226; 62 pages; dated Jan. 16, 2019.
Korean Intellectual Property Office; Notice of Allowance issued in Application No. 10-2018-7017226; 4 pages; dated Jul. 22, 2019.
The Japanese Patent Office; Decision of Refusal issued in Application No. 2018-212055 dated Oct. 15, 2019.
European Patent Office; Examination Report issued in Application No. 18179479.3 dated Oct. 16, 2019.
European Patent Office; International Search Report and Written Opinion of PCT Serial No. PCT/US16/034290; 12 pages; dated Jul. 29, 2016.
Korean Intellectual Property Office; Office Action issued in Application No. 1020177026523; 100 pages; dated Dec. 18, 2017.
European Patent Office, Intention to Grant European Patent for Application No. 16 730 101.9; 7 pages; dated Jan. 30, 2018.
Korean Intellectual Property Office; Allowance of Patent issued in Application No. 1020177026523; 3 pages; dated Mar. 16, 2018.
Japanese Patent Office; Notice of Reasons for Rejection issued in Application No. 2017-550867; 7 pages; dated Apr. 16, 2018.
German Patent and Trademark Office; Office Action issued in Application No. 112016000986.0; 12 pages; dated Jul. 20, 2018.
Japanese Patent Office; Notice of Allowance of Application No. 2017-550867, 6 pages, dated Oct. 15, 2018.
China National Intellectual Property Administration; Office Action issued in Application No. 201680019315.8; 13 pages; dated Jan. 30, 2019.
China National Intellectual Property Administration; Notice of Grant issued in Application No. 201680019315.8; 6 pages; dated Aug. 1, 2019.
European Patent Office; Extended European Search Report issued in Application No. 18179479.3; 8 pages; dated Aug. 7, 2018.
China National Intellectual Property Administration; Notification of First Office Action issued in Application No. 201910977782.7, 12 pages, dated Mar. 23, 2023.

\* cited by examiner

UP AND DOWN BURGER BAR

*Sit-down Restaurant With Inventive Burgers and a Nice Atmosphere*
Hours Today: 9:30 AM – 11:00 PM

Up and Down Burger Bar is a favorite spot among locals and has been serving juicy hamburgers and hot fries for over 35 years.

Click HERE for Menu
Click HERE for Photos of Delicious Burgers
Click HERE for Contact Information

Reviews of Up and Down Burger Bar
- The Burgers here are terrific, but the truffle fries are the star of the show. Moreover, service is always fast and friendly ... (see full review)

- Friendly staff and good food. I had the Sideways Burger with extra cheese and extra bacon – it was delicious!

- The Burgers receive all of the praise, but the appetizers are also great. The group I was with split the fried pickles and green chili wontons. They were so good we ended up

680A

 681  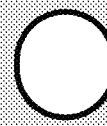 682  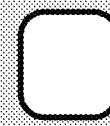 683

FIG.6A

Bob: Any plans for tonight?

You: Nope

Bob: There's a new Up and Down Burger Bar that opened in Mountain View. Want to head there for dinner?

PROVIDING SUGGESTED VOICE-BASED ACTION QUERIES

BACKGROUND

Voice query applications are increasingly being used in the control of computing devices. One use of a voice query application is with portable computing devices such as mobile phones, watches, tablet computers, head-mounted devices, virtual or augmented reality devices, vehicular electronic systems (e.g., automotive systems that incorporate navigation and audio capabilities), etc. Many voice query applications have evolved to respond to natural language requests and/or manage back-and-forth dialogs or conversations with users. Many voice query applications incorporate both an initial speech-to-text conversion that converts an audio recording of a human voice to text, and a semantic analysis that analyzes the text in an attempt to determine the meaning of a user's request. Based upon a determined meaning of a user's spoken input, a computer-based action may be undertaken such as performing a search, providing driving directions, or otherwise controlling one or more applications of a computing device.

The prevalence and/or capabilities of voice query applications has increased and may continue to increase. However, in many instances a user may not fully appreciate the capabilities afforded by the voice query application of a computing device being utilized by the user.

SUMMARY

The technology of this specification may facilitate user discovery of various voice-based action queries that can be spoken to initiate computer-based actions, such as voice-based action queries that can be provided as spoken input to a computing device to initiate computer-based actions that are particularized to content being viewed or otherwise consumed by the user on the computing device.

Some implementations of this specification are generally directed to determining, in view of content recently viewed by a user on a computing device, at least one suggested voice-based action query for presentation via the computing device. The suggested voice-based action query indicates a voice query that can be spoken to initiate performance of a computer-based action directed to one or more aspects of the content. Some implementations of the technology are additionally or alternatively generally directed to receiving at least one suggested voice-based action query at a computing device and providing the suggested voice-based action query as a suggestion in response to input to initiate providing of a voice-based query via the computing device. The provided suggested voice-based action query may be particularized to content currently and/or recently visible on the computing device and may be generated based on an indication of the content provided by the computing device.

In some implementations, a suggested voice-based action query may be presented in response to user input initiating a voice-based query (e.g., selecting a voice query interface element or speaking a phrase that initiates a voice-based query), and based on to that input being followed by an indication of a need for a suggested voice-based action query. In some of those implementations, an indication of the need for a suggested voice-based action query may include the lack of any spoken input from a user within a threshold amount of time following the user input initiating the voice-based query. For example, in versions of those implementations a suggested voice-based action query may be presented in response to the user not providing any spoken input within four seconds (or other threshold amount of time) of the user input initiating the voice-based query.

In some implementations, a suggested voice-based action query includes an action term and an entity term that are particularized to an entity of content recently viewed on the computing device, such as content currently being viewed on the computing device. In some of those implementations, those suggested voice-based action queries may include a generic descriptor for the entity, such as a pronoun for the entity. For example, for the entity associated with the actor Harrison Ford, the suggested voice-based action query may be "tell me more about him", where "him" is used instead of Harrison Ford. Also, for example, for a particular restaurant, the suggested voice-based action queries may be "navigate there", "show me its menu", etc., where "there" and "its" are used instead of a particular name of the restaurant.

In some implementations, a method is provided that comprises receiving, from a computing device, an indication of content recently viewed on the computing device. The method further comprises determining an entity referenced in the content and determining a computer-based action mapped to the entity in one or more electronic databases. The method further comprises generating a suggested voice-based action query that includes at least one action term that initiates performance of the computer-based action and that includes at least one entity term selected based on the entity. The method further comprises receiving a voice-based query input indication from the computing device and providing the suggested voice-based action query to the computing device in response to receiving the voice-based query input indication. The voice-based query input indication indicates receipt of input of the user via the computing device to initiate providing of a voice-based query via the computing device. The suggested voice based action query is provided to the computing device for display as a suggestion for the voice-based query.

These and other implementations of technology disclosed herein may optionally include one or more of the following features.

In some implementations, the method further comprises determining an indication of a need for suggested voice-based action queries; and providing the suggested voice-based action query for display as the suggestion based on determining the indication of the need for suggested voice-based action queries. In some of those implementations, determining the indication of the need for suggested voice-based action queries is based on not receiving spoken input from the user at the computing device within a threshold amount of time from the input of the user to initiate providing of the voice-based query.

In some implementations, determining the indication of the need for suggested voice-based action queries is based on detecting at least a threshold noise level by the computing device following the input of the user to initiate providing of the voice-based query.

In some implementations, receiving the indication of the content comprises receiving terms of the content and display properties for each of the terms in the content and determining the entity referenced in the content comprises determining the entity based on at least one term of the terms and the display properties for the term in the content.

In some implementations, determining the computer-based action mapped to the entity comprises determining a class of the entity, and identifying a mapping of the computer-based action to the class.

In some implementations, generating the voice-based action query comprises determining a generic descriptor mapped to the entity, and using the generic descriptor as the at least one entity term. In some of those implementations, the generic descriptor is a pronoun mapped to the entity. In versions of the implementations where the generic descriptor is a pronoun mapped to the entity, the method further comprises identifying an image of the entity and providing the image of the entity to the computing device for display as an annotation for the suggested voice-based action query.

In some implementations, the method further comprises receiving, from the computing device, an indication of a preferred language of the computing device. In some of those implementations, generating the suggested voice-based action query comprises selecting the action term based on a mapping of the action term to the computer-based action and based on a mapping of the action term to the preferred language. In some of those implementations, generating the suggested voice-based action query comprises selecting the entity term based on the preferred language.

In some implementations, the method further comprises receiving application information from the computing device. The application information indicates at least one of: an application installed on the computing device, and a version of the application installed on the computing device. In some of those implementations, determining the computer-based action comprises selecting the computer-based action based on a mapping of the computer-based action to at least one of: the application installed on the computing device, and the version of the application installed on the computing device.

In some implementations, the method further comprises receiving an indication of an application in which the content was generated. In some of those implementations, determining the computer-based action comprises selecting the computer-based action based on the indication of the application in which the content was generated.

In some implementations, selection of the suggested voice-based action query at the computing device causes a first application of the computing device to perform at least one aspect of the computer-based action. In some of those implementations, the method further comprises: determining an additional computer-based action mapped to the entity in the at least one electronic database; generating an additional suggested voice-based action query that includes at least one additional action term that initiates performance of the additional computer-based action and that includes the at least one entity term; and providing the additional suggested voice-based action query to the computing device in response to receiving the voice-based query indication, the additional suggested voice-based action query provided to the computing device for display as an additional suggestion for the voice-based query. In some of those implementations, selection of the additional suggested voice-based action query at the computing device causes a second application of the computing device to perform at least one aspect of the additional computer-based action.

In some implementations, the content recently viewed on the computing device is the content most recently viewed relative to the input of the user via the computing device to initiate the providing of the voice-based query via the computing device. In some of those implementations, the indication of the content is provided by the computing device in response to the input of the user via the computing device to initiate the providing of the voice-based query via the computing device.

In some implementations, the content recently viewed on the computing device is the content most recently viewed in an application of the computing device. In some of those implementations, the content most recently viewed in the application of the computing device is the content currently displayed by the computing device.

In some implementations, a method is provided that comprises receiving, at a computing device, input to initiate providing of a voice-based query via the computing device. The method further comprises identifying, by the computing device, content displayed by the computing device most recently relative to receiving the input. The method further comprises providing an indication of the content and receiving a suggested voice-based action query that is based on the indication of the content and that includes at least one action term and at least one entity term. The entity term references an entity of the content and the action term is mapped to the entity and initiates performance of a computer-based action. The method further comprises determining that no spoken input has been received from the user within a threshold amount of time relative to receiving the input; and in response to determining the no spoken input has been received within the threshold amount of time, providing the suggested voice-based action query as a suggestion for the voice-based query.

These and other implementations of technology disclosed herein may optionally include one or more of the following features.

In some implementations, the method further comprises providing an indication of a preferred language of the computing device with the indication of the content. In some of those implementations, the suggested voice-based action query is received in the preferred language of the computing device in response to providing the indication of the preferred language.

In some implementations, the method further comprises identifying a selection of the suggested voice-based action query and performing the computer-based action based on identifying the selection of the suggested voice-based action query.

In addition, some implementations include an apparatus including memory and one or more processors operable to execute instructions stored in the memory, where the instructions are configured to perform any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6A illustrates an example graphical user interface showing content displayed in an application of a computing device.

DETAILED DESCRIPTION

Figure 1:
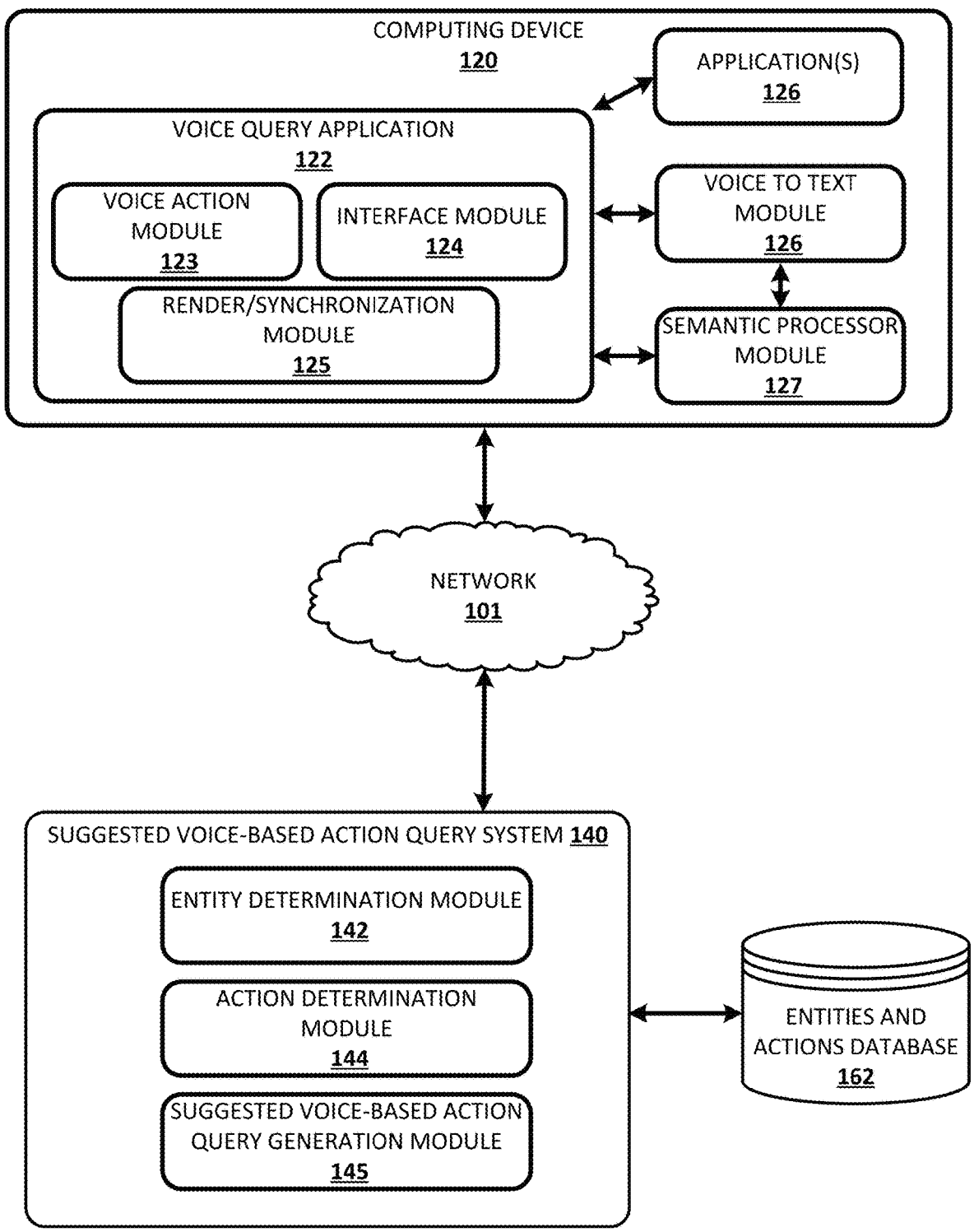
FIG. 1 is a block diagram of an example environment in which techniques disclosed herein may be implemented.

In implementations described herein, techniques are disclosed for generating one or more suggested voice-based action queries in view of content being accessed on a computing device. Techniques are also disclosed that facilitate user discovery of various voice-based action queries that can be spoken to initiate computer-based actions, such as voice-based action queries that can be provided as spoken input to a computing device to initiate computer-based actions that are particularized to content currently being accessed by the user on the computing device. Further details regarding selected implementations are discussed hereinafter. It will be appreciated however that other implementations are contemplated so the implementations disclosed herein are not exclusive.

As one example of implementations described herein, assume a user is using an application on the user's phone that provides detailed information related to selected movies, actresses, actors, etc. Further assume the user has used the application to navigate to content about the film Blade Runner such as content that includes the title of the film, a synopsis of the film, actors in the film, etc. The user may initiate a voice query via the phone and an indication of the content presented in the application may be sent by the user's phone to a server. The server may utilize the indication of content to determine a dominant entity of the content is the entity related to the movie "Blade Runner", may determine computer-based actions related to the movie, and may determine suggested voice-based action queries that will cause performance of those actions for the movie. For example, suggested voice-based action queries of "how can I watch it", "watch it", and "tell me more about it" may be determined. The suggested voice-based action queries may be provided to the user's phone for presentation to the user. For example, the suggested voice-based action queries may be graphically displayed in one or more information "cards" and/or in a "drop down menu" near a voice query graphical interface, optionally along with text such as "try speaking any one of the following."

In some implementations, the suggested voice-based action queries are not presented to the user via the user's phone until after at least a threshold period of time has passed since the voice query was initiated. In some implementations, the user may select one of the suggested voice-based action queries without speaking (e.g., via tapping it) to execute the query for performance of the associated action and/or the user may speak one of the suggested voice-based action queries to execute the query for performance of the associated action.

Generally, a voice-based action query that initiates performance of a computer-based action is a query that includes an action term mapped to the computer-based action and an entity term that is the focus of the action. In some implementations, the action term may be a verb and the entity term may be a noun or pronoun. When executed, a voice-based action query causes performance of a computer-based action mapped to the action term and causes performance of the computer-based action in view of the entity mapped to the entity term.

For example, a voice-based action query of "tell me more about blade runner" may cause a search query to be submitted that is particularized to "blade runner", and search results to be provided responsive to the search query. Also, for example, a voice-based action query of "navigate to a coffee shop" may cause a navigation application to provide the user with active navigation directions to a nearby coffee shop. As yet another example, a voice-based action query of "call restaurant A" may cause a phone dialing application to prepopulate and/or automatically call the phone number for Restaurant A.

In some implementations, a computer-based action may be mapped to one or more computer applications that can perform the action and execution of a voice-based action query that includes a term associated with the action may cause at least one of those computer applications to automatically perform the action, or present an option for performance of the action. For example, an action associated with "calling" may be mapped to a phone application, an action associated with "making a restaurant reservation" may be mapped to a restaurant reservation application, etc. In some implementations, a voice query application may perform some of an action, the entirety of an action, and/or may process a voice-based action query to facilitate performance of an action by another application (e.g., parse the query and interface with another application based on the parsed query and an API of the application).

Now turning to FIG. 1, an example environment in which techniques disclosed herein may be implemented is illustrated. The example environment includes a voice-enabled computing device 120, a suggested voice-based action query system 140, an entities and actions database 162, and a network 101. The network 101 may comprise one or more networks such as a local area network (LAN) or wide area network (WAN) (e.g., the Internet). In some implementations, the voice-enabled computing device 120 is a portable computing device such as cellular phone, tablet computer, laptop computer, watch, head-mounted device (e.g., glasses), virtual or augmented reality device, other wearable device, an audio/video system, a navigation system, automotive and other vehicular system, etc.

In the implementation of FIG. 1, voice input received by voice-enabled computing device 120 is processed by a voice query application 122, which in some implementations may be a search application that includes voice query functionality. In some implementations, voice query application 122 may be a stand-alone application. In some implementations, voice query application 122 may be integrated, in whole or in part, as part of the operating system or firmware of the computing device 120.

Voice query application 122 in the illustrated implementation includes a voice action module 123, an interface module 124, and a render/synchronization module 125. Voice action module 123 monitors for voice input directed to the voice query application 122, coordinates the analysis of received voice input, and coordinates performance of one or more computer-based actions that are responsive to the received voice input. As described herein, voice action module 123 further coordinates the providing of information to the suggested voice-based action query system 140 and the presentation of suggested voice-based action queries received from the system 140 as suggestions for a voice query.

Interface module 124 provides an interface with suggested voice-based action query system 140 and/or other systems. The interface module 124 provides information to the suggested voice-based action query system 140, such as indications of content accessed on the computing device 120, indications of a preferred language of the computing device 120, information related to one or more applications 126 of computing device 120, and/or voice-based query input indications. The interface module 124 further receives suggested voice-based action queries from suggested voice-based action query system 140 in response to information provided by the interface module 124.

Render/synchronization module 125 manages the presenting of suggested voice-based action queries to a user, e.g., via a visual display, spoken audio, or other feedback interface suitable for a particular voice-enabled device. In addition, in some implementations, module 125 also handles synchronization with other online services, such as when a response or action affects data maintained for the user in another online service (e.g., where voice input requests creation of an appointment that is maintained in a cloud-based calendar).

In some implementations, all or aspects of one or more of the modules 123-125 may be combined and/or implemented in another module. For example, in some implementations one or more aspects of module 124 may be incorporated in module 123. Also, although modules 123-125 are illustrated in the example environment of FIG. 1 as being provided on computing device 120, this is not meant to be limiting. In other implementations, all or aspects of one or more of the modules 123-125 may be implemented on suggested voice-based action query system 140 and/or another computing device. Additional description of modules 123-125 is provided herein (e.g., in description related to FIG. 3).

Voice query application 122 may rely on various middleware, framework, operating system and/or firmware modules to handle voice input, including, for example, a voice to text module 126 and/or a semantic processor module 127. One or more (e.g., all) aspects of modules 126 and/or 127 may be implemented as part of voice query application 122 and/or in another computing device, such as system 140. Voice to text module 126 receives an audio recording of voice input (e.g., in the form of digital audio data), and converts the digital audio data into one or more text words or phrases (also referred to herein as tokens). In some implementations, voice to text module 126 is also a streaming module, such that voice input is converted to text on a token-by-token basis and in real time or near-real time, such that tokens may be output from module 126 effectively concurrently with a user's speech, and thus prior to a user enunciating a complete spoken request. Voice to text module 126 may rely on one or more acoustic and/or language models, which together model a relationship between an audio signal and phonetic units in a language, along with word sequences in the language. In some implementations, a single model may be used, while in other implementations, multiple models may be supported, e.g., to support multiple languages, multiple speakers, etc.

Whereas voice to text module 126 converts speech to text, semantic processor module 127 attempts to discern the semantics or meaning of the text output by voice to text module 126 for the purpose or formulating an appropriate response. For example, the semantic processor module 127 may rely on one or more grammar models to map action text to particular computer-based actions and to identify entity text and/or other text that constrains the performance of such actions. In some implementations, a single model may be used, while in other implementations, multiple models may be supported, e.g., to support different computer-based actions or computer-based action domains (i.e., collections of related actions such as communication-related actions, search-related actions, audio/visual-related actions, calendar-related actions, device control-related actions, etc.)

As an example, a grammar model (stored on computing device 120 and/or remote computing device(s)) may map computer-based actions to action terms of voice-based action queries such as the action terms "tell me more about", "directions to", "navigate to", "watch", "call", "email", "contact", etc. For instance, the action term "tell me more" may be mapped to a search query and presentation of search results action; the action term "watch" may be mapped to a video viewing action performed via one or more of the applications 126; and the action term "call" may be mapped to a calling action preformed via one or more of the applications 126.

The grammar model(s) and/or other models relied upon by semantic processor module 127 may incorporate various rules to initiate performance of a computer-based action based on text input provided by voice to text module 126. In some implementations, for example, actions may be defined as functions F such that $F(i_T)=A_U$, where T represents the type of the input interpretation and U represents the type of output action. F may therefore include a plurality of input pairs (T, U) that are mapped to one another, e.g., as $f(i_t)=a_u$, where $i_t$ is an input proto variable of type t, and $a_u$ is an output modular argument or parameter of type u. It will be appreciated that some parameters may be directly received as voice input, while some parameters may be determined in other manners, e.g., based upon an indication of content most recently viewed on the computing device, a geographic location of the computing device, etc. For example, if a user were to say "remind me to email John when I get to work," the "work" entity text may not be used to identify a particular location without additional information such as the user's assigning of a particular address as a work location. Also, for example, if a user were to say "tell me more about it", the "it" entity text may not be used to identify a particular entity without additional information such as a dominant entity of content currently being viewed on the computing device 120. In some implementations, suggested voice-based action query system 140 and/or another system may include complementary functionality for handling voice input, e.g., using a voice-based query processor that relies on various acoustic/language, grammar, and/or action models. In other implementations, however, no complementary functionality may be used.

In some implementations, the computer-based actions that are initiated by semantic processor module 127 may be dependent on the rules available to semantic processor module 127. Also, the computer-based actions that are initiated by the semantic processor module 127 may be dependent on the applications 126 that are installed on the computing device 120 and/or the versions of the applications 126 that are installed on the computing device 120. For example, certain computer-based actions may only be performable by certain applications 126 and/or certain versions of applications 126. For instance, a "call" action may only be performable if a phone application is included in the applications 126.

The suggested voice-based action query system 140 in some implementations may be implemented as a cloud-based service employing a cloud infrastructure, e.g., using a server farm or cluster of high performance computers running software suitable for handling high volumes of requests from multiple users' computing devices. The suggested voice-based action query system 140 is capable of querying one or more databases, such as entities and actions database 162, to locate information for generating suggested voice-based action queries. The suggested voice-based action query system 140 includes an entity determination module 142, an action determination module 144, and a suggested voice-based action query generation module 145.

The suggested voice-based action query system 140 receives, from the computing device 120, an indication of the content recently accessed on the computing device 120 (e.g., the content currently being displayed by the computing device 120). The content may be accessed on the computing device 120 in one of the applications 126. The applications 126 may include one or more of a variety of applications that may be installed on the computing device 120 such as, for example, a web browser application, a personal assistant application, a business reviews application, a social networking application, a music application, a video application, and/or an application that provides an interface for exploring information about movies, tv shows, and other media. In some implementations, the indication of the content may comprise indications that are specific to the "view port" of the content on the computing device 120. For example, text of the content and a screenshot of the content may be provided for only that portion of the content that is actively displayed on the computing device 120. In some implementations, the indication of the content may additionally and/or alternatively comprise indications for portions of the content that are not actively displayed on the computing device 120. For example, metadata that is not actively displayed may be provided and/or text from other portions of the content that are not actively displayed may be provided. For instance, text that it is not displayed, but would be displayed by scrolling up or down, may be provided.

The entity determination module 142 determines one or more entities referenced in the content based on the indication of the content. An entity may be, for example, associated with one of a person, a location of interest, an address, a phone number, etc. In some implementations, determining the entity comprises identifying text associated with the entity based on position, format, frequency, and/or other property of the text in the content. In some implementations, the entity determination module 142 may identify multiple entities, such as a dominant entity in the content and one or more additional prominent entities in the content.

As one example, the indication of the content may comprise text, metadata, images, tags applied to image(s), and/or screenshots of the content most recently viewed on the computing device and the entity determination module 142 may determine an entity referenced in the content based on such information. For instance, the indication of the content may include text and properties of the text in the content and entity determination module 142 may determine a dominant entity associated with the content based on position, format, frequency, and/or other property of the text in the content. As used herein, a dominant entity in content refers to the entity in the content that is most prevalent in that content based on analysis of one or more properties of that content. For example, for content about the movie Blade Runner, the text "Blade Runner" may be identified as the dominant entity based on it appearing in larger font than other text, in a more prominent position than other text, and/or more frequently than other text. The text "Blade Runner" itself may be utilized as the dominant entity, or the entity determination module 142 may resolve a particular entity based on the text and with reference to one or more databases such as a knowledge graph.

As another example, the indication of the content may comprise a URL or another identifier of the content, and the entity determination module 142 may utilize the identifier to determine an entity referenced in the content. For example, the entity determination module 142 may access a database that maps identifiers of content to one or more entities referenced in the content (e.g., a database that defines a dominant entity and/or other entities for each of a plurality of documents such as publicly accessible documents). Also, for example, the entity determination module 142 may utilize the identifier to locate the content and may directly analyze the content to determine an entity referenced in the content. For instance, where the identifier is a URL, the entity determination module 142 may access the URL and determine the entity based on content provided by accessing the URL.

As yet another example of determining an entity based on an indication of content, the entity determination module 142 may determine the entity based on text in the content that has one or more specific properties. For instance, the entity determination module 142 may determine a phone number as an entity based on one or more regular expressions that identify text that conforms to the format "XXX-XXX-XXXX" or "(XXX) XXX-XXX". Also, for instance, the entity determination module 142 may determine an address as an entity based on text that is associated with metadata identifying it as an address and/or text that is in the form of an address (e.g., City, State Zip). Also, for instance, the entity determination module 142 may determine certain text as an entity based on it being in a "white list" of entities, being mapped to a "location of interest", being mapped to a "famous person", and/or based on other properties of the text.

The action determination module 144 determines one or more computer-based actions that can be performed for the entity (or entities) determined by entity determination module 142. In some implementations, the action determination module 144 determines the computer-based actions based on the computer-based actions being mapped to the entity in one or more databases such as entities and actions database 162. The entities and actions database 162 includes a mapping of each of a plurality of entities to one or more computer-based actions associated with the entity. An action may be directly mapped with an entity and/or may be indirectly mapped to the entity via a mapping with a class of the entity. For example, the action of dialing a phone number may be mapped to each of a plurality of particular phone numbers and/or may be associated with the class of phone numbers in general. Also, for example, the action of playing a movie may be mapped to each of a plurality of movies, movies in general, and/or only movies that are available for on-demand viewing via one of the applications installed on the computing device 120.

In implementations where multiple actions are identified for an entity, the action determination module 144 may optionally rank and/or filter the identified actions based on one or more factors such as, for example: strengths of association of the actions to the entity and/or a class of the entity; historical popularity of the actions in general; historical popularity of the actions for the application from which the content originated; whether the actions are performable via one or more applications 126 installed on the computing device 120; historical popularity of performance of the actions via one or more applications 126 installed on the computing device 120; etc.

For example, the entities and actions database 162 may include, for a mapping between an action and an entity or entity class, a strength of association for that mapping. The strength of association of an action to an entity may optionally be based on analysis of past voice search queries. For instance, a computer-based action of providing navigation may be more strongly associated with an entity class of restaurants than a computer-based action of calling if 1,000 analyzed past voice search queries generally conform to the format "navigate to [restaurant]" (where "[restaurant]" indicates reference to an entity that is a member of the class of restaurants), but only 100 analyzed past voice search queries generally conform to the format "call [restaurant]".

The historical popularity of a computer-based action in general may be based on a frequency of appearance of terms that initiate the computer-based action in past voice search queries. The historical popularity of a computer-based action for an application from which the content originated may be based on a frequency of appearance of terms that initiate the computer-based action in past voice search queries that were issued while using the application and/or that were issued within a threshold time period of using the application. For instance, analysis of past voice search queries may indicate a computer-based action of calling is less popular for a web browser application than it is for an application that provides consumer reviews for businesses.

In some implementations, the computer-based action identified by the action determination module 144 may be a computer identifier of the action that is not itself an action term that would initiate performance of the action if provided as a voice query. For example, the computer identifier of the action of providing active navigation directions may be and an alpha and/or numerical identifier such as "ID_NAVIGATE", "42", and/or "AE5".

The suggested voice-based action query generation module 145 generates one or more suggested voice-based action queries each based on one or more action terms to perform one of the computer-based actions determined by action determination module 144 and one or more entity terms that reference the entity determined by entity determination module 142.

In some implementations, the suggested voice-based action query generation module 145 determines the action term(s) for a computer-based action based on a preferred language indicated by the computing device 120. For example, a computer identifier of the computer-based action may be determined by the action determination module 144 and a first term may be identified as the action term if the computing device 120 has a preferred language of English, whereas a second term would be identified as the action term if the computing device 120 had a preferred language of German. For instance, the entities and actions database 162 and/or other database may include, for a given computer-based action, action terms mapped to that action. Each of the action terms may further be mapped to a preferred language of the action term. The action determination module 144 may select an action term for a computer-based action in view of a preferred language based on identifying a mapping of the action term to the computer-based action and further identifying a mapping of the action term to the preferred language.

The suggested voice-based action query generation module 145 further determines one or more terms that reference the identified entity. For example, where the identified entity is itself is a term, that term may be utilized. For instance, where "Restaurant A" is the entity, "Restaurant A" may be utilized as the entity term. In some implementations, a pronoun or other generic descriptor of the entity may be utilized. For example, where "Restaurant A" is the entity, the suggested voice-based action query generation module 145 may determine an entity term of "it" or "there". Also, for example, where a famous male is the entity, the suggested voice-based action query generation module 145 may determine an entity term of "he" or "him". The particular generic descriptor selected may be determined based on a mapping of the generic descriptor to the entity and/or a class of the entity. Also, the particular generic descriptor may optionally be further selected to provide grammatical coherence with the action term. For instance, the entity term "there" may be selected for an action term of "navigate", whereas "it" may be selected for action terms of "tell me more about".

In some implementations, the suggested voice-based action query generation module 145 determines the entity term based on a preferred language indicated by the computing device 120. For example, a first generic descriptor may be identified as the entity term if the computing device 120 has a preferred language of English, whereas a second generic descriptor would be identified as the entity term if the computing device 120 had a preferred language of German.

The suggested voice-based action query system 140 provides the generated one or more suggested voice-based action queries to the voice query application 122 for presentation, by the voice query application 122, as a suggested voice-based action query for a voice-based query. In implementations where multiple suggested voice-based action queries are provided, they may optionally be provided with ranking information based on, for example, the ranking of the actions described with respect to action determination module 144. In some of those implementations, the computing device 120 may determine a display order of the suggested voice-based action queries based on the provided ranking information. The ranking information may optionally be an order in which the suggested voice-based action queries are transmitted or included in a data packet.

Where the provided suggested voice-based action queries include a generic descriptor of the entity (e.g., him), the suggested voice-based action query system 140 may optionally provide the suggested voice-based action queries with metadata that more particularly identifies the entity. The metadata may be utilized by the computing device 120 to "replace" the generic descriptor with the more particular identification of the entity in performing the action. In other implementations, the more specific identification of the entity may be performed at the computing device 120 (e.g., by semantic processor module 127), based on analysis of the most recently accessed content.

In some implementations, the suggested voice-based action query system 140 provides the generated one or more suggested voice-based action queries to the voice query application 122 in response to receiving a voice-based query input indication from the computing device 120. The voice-based query input indication indicates receipt of input of the user, via the computing device 120, to initiate providing of a voice-based query via the computing device 120. In some implementations, the voice-based query input indication is the receiving of the indication of content from the computing device 120 and/or the receiving of other information in combination with the indication of content. For example, in some implementations the computing device 120 may only provide the indication of content in response to input of the user that initiates providing of a voice-based query. In some implementations, the voice-based query input indication may be received separate from the indication of content. For example, in some implementations the computing device 120 may provide the indication of content, then only provide the voice-based query input indication after a certain amount of time has passed, since receiving the voice-input indication, without receiving any spoken input from the user.

In some implementations, the suggested voice-based action query system 140 may not be limited to generating suggested voice-based action queries. For example, the suggested voice-based action query system 140 may also be capable of handling all or aspects of parsing submitted voice-based action queries, determining appropriate computer-based action(s) for submitted voice-based action queries, instructing one or more applications of computing device 120 to perform determined computer-based actions for submitted voice-based action queries, and/or performing one or more computer-based actions for submitted voice-based action queries. Although suggested voice-based action query system 140 and computing device 120 are illustrated as separate components in FIG. 1, in other implementations one or more aspects of voice-based action query system 140 may be implemented on computing device 120, or vice versa.

Figure 2:
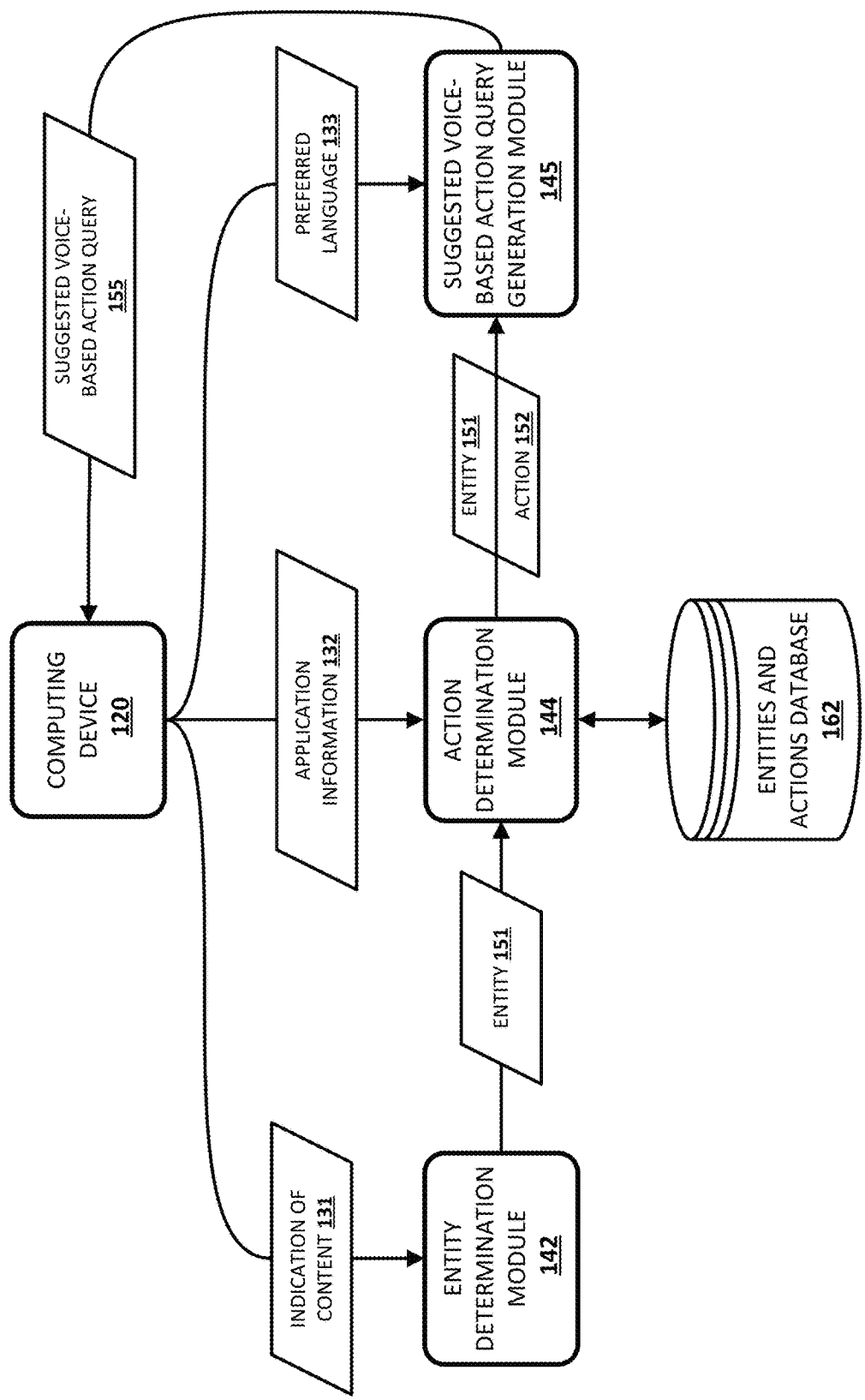
FIG. 2 illustrates an example of determining, in view of content being accessed on a computing device, at least one suggested voice-based action query for presentation via the computing device.

FIG. 2 illustrates an example of determining, in view of content being accessed on the computing device 120, at least one suggested voice-based action query 155 for presentation via the computing device 120. In FIG. 2, an indication of content 131 from the computing device 120 is provided to the entity determination module 142. For example, the indication of content 131 may include text and properties of the text for content being viewed on the computing device 120 immediately prior to input of a user via the computing device 120 to initiate providing of a voice-based query. For instance, the user may be viewing the content in an application of the computing device 120 and the user may provide input to initiate providing of a voice-based query while that application is still active and displaying the content, and the content may be provided in response to the input. As another example, the user may be viewing the content on a first application of the computing device 120, may provide input to initiate providing of a voice-based query that causes additional content to be displayed (either supplanting the content of the first application or provided "over" portions of the content of the first application) by a second application (or the operating system) of the computing device 120, and the content recently displayed by the first application may be provided in response to the input. As yet another example, the computing device 120 may provide an indication of currently viewed content without first requiring input of a user to initiate providing of a voice-based query.

The entity determination module 142 determines at least one entity 151 based on the indication of the content 131. For example, the entity determination module 142 may determine a dominant entity associated with the content based on position, format, frequency, and/or other property of the text in the content. For example, certain text may be identified as the dominant entity based on it appearing in the title of the content, in larger font than other text in the content, in a more prominent position than other text in the content, and more frequently than other text in the content.

The entity determination module 142 provides the determined entity 151 to the action determination module 144. The action determination module 144 determines at least one computer-based action 152 that is mapped to the entity 151 in the entities and actions database 162. The action determination module 144 may determine the action 152 based on a direct mapping of the entity 151 to the action 152, or based on a mapping of the action 152 to a class of the entity 151, and a mapping of the class of the entity 151 to the action 152.

Application information 132 from the computing device 120 may also be provided to the action determination module 144. In some implementations, the action determination module 144 may rank and/or filter computer-based actions based on the application information 132. For example, the application information 132 may indicate one or more applications installed on the computing device (e.g., applications 126) and/or versions for one or more applications installed on the computing device (e.g., application 126 and/or 122). For example, entities and actions database 162 may include, for each of a plurality of computer-based actions, data defining one or more applications and/or application versions (for applications 126 and/or 122) via which the computer-based action may be performed. The action determination module 144 may utilize such data to filter out one or more computer-based actions that are not compatible with the computing device 120 based on the application information 132.

As another example, the application information 132 may indicate which application was generating the content indicated by indication of content 131. The entities and actions database 162 may include the historical popularity of one or more candidate computer-based actions with respect to that application from which the content originated (e.g., based on a frequency of appearance of terms that initiate the computer-based action in past voice search queries that were issued while using the application and/or that were issued within a threshold time period of using the application). The action determination module 144 may utilize such historical popularity to select the action 152 and/or rank the action 152 relative to other selected actions.

The action determination module 144 provides the entity 151 and the action 152 to the suggested voice-based action query generation module 145 (optionally with other determined entities and/or actions). The suggested voice-based action query generation module 145 generates a suggested voice-based action query 155 based on one or more action terms to perform the action 151 and one or more entity terms that reference the entity 152. In some implementations, a preferred language 133 from the computing device 120 may also be provided to the suggested voice-based action query generation module 145. In some of those implementations, the suggested voice-based action query generation module 145 determines the action term(s) for a computer-based action and/or the entity terms based on a preferred language indicated by the computing device 120.

The suggested voice-based action query generation module 145 provides the suggested voice-based action query 155 to the computing device 120. For example, the suggested voice-based action query 155 may be provided to the computing device 120 as a text string that includes the one or more action terms and the one or more entity terms. In some implementations, the suggested voice-based action generation module 145 provides the generated one or more suggested voice-based action queries to the computing device 120 in response to receiving a voice-based query input indication from the computing device 120. In some of those implementations, the voice-based query input indication is the receiving of the indication of content 131 from the computing device 120 and/or the receiving of other information in combination with the indication of content 131.

In some implementations, the suggested voice-based action query generation module 145 provides annotation data with the suggested voice-based action query 155. The annotation data is data that may be displayed with the suggested voice-based action query 155 to help clarify the suggested voice-based action query 155, but doesn't constitute the suggested query itself. For example, where a pronoun is used as the entity term of the suggested voice-based action query 155, an image of the entity and/or a more specific alias of the entity may also be provided for display visually set off from the voice-based action query 155 (e.g., provided in parentheses and/or positionally offset).

Figure 3:
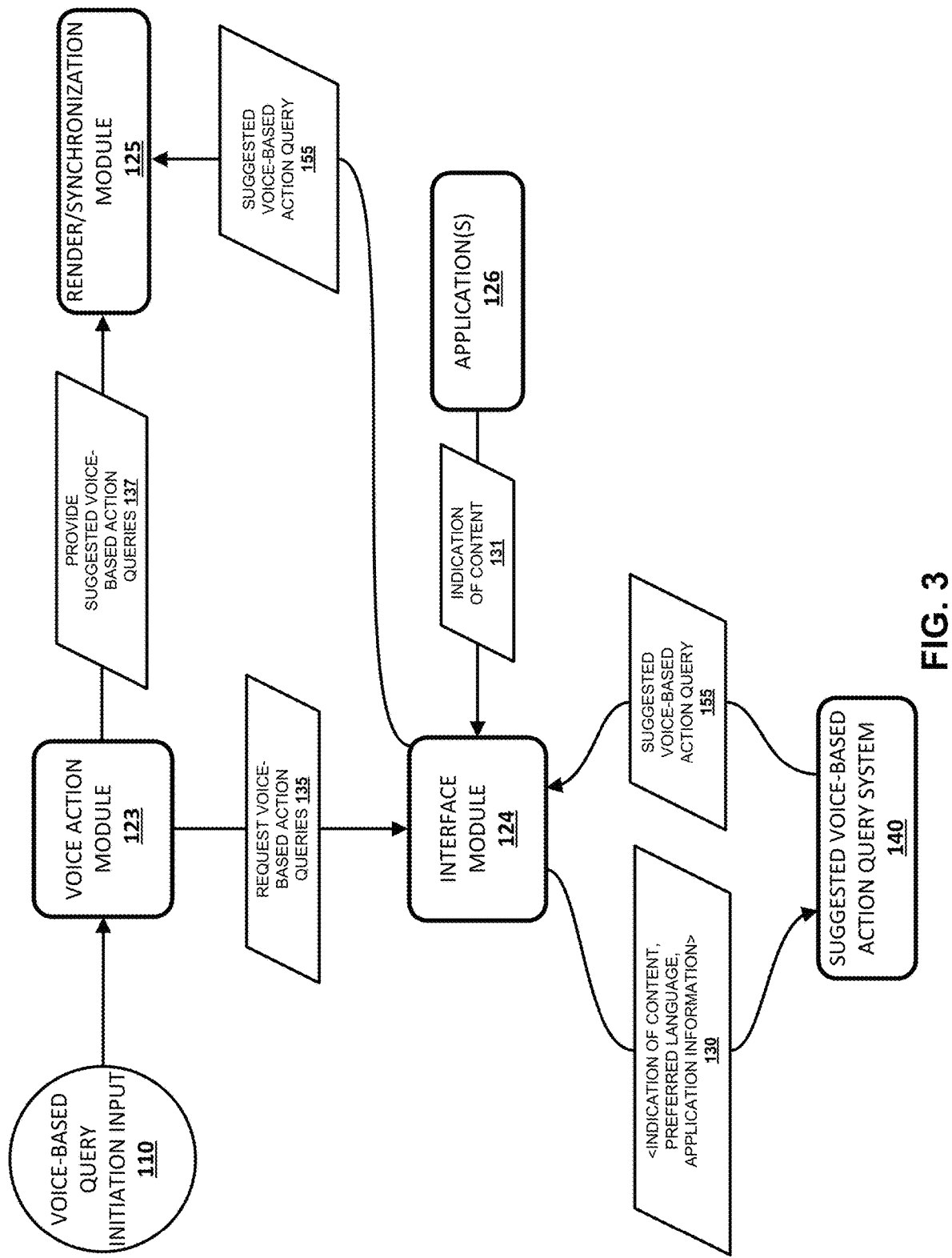
FIG. 3 illustrates an example of receiving at least one suggested voice-based action query at a computing device and providing the suggested voice-based action query as a suggestion in response to input to initiate providing of a voice-based query.

FIG. 3 illustrates an example of receiving at least one suggested voice-based action query at a computing device and providing the suggested voice-based action query as a suggestion in response to input to initiate providing of a voice-based query. A voice-based query indication input 110 is received at voice action module 123. Voice-based query indication input 110 may include, for example, a user selecting a voice query icon via a graphical user interface, the user speaking a phrase that initiates a voice-based query (e.g., "OK computer"), the user actuating a touch-sensitive hardware element of the computing device 120 or in communication with the computing device 120 (e.g., a mechanical button, a capacitive button), and/or performing a gesture in view of a camera or other sensor of the computing device 120.

The voice action module 123 monitors for voice input in response to the voice-based query initiation input 110 and also sends a request voice-based action queries command 135 to interface module 124. In response to the command 135, the interface module 124 provides information 130 to the suggested voice-based action query system 140, such as an indication of content 131 most recently accessed via one of the applications 126, indications of a preferred language of the computing device 120, information related to one or more applications 126 of computing device 120, and/or voice-based query input indications. For example, the indication of content 131 may be the content displayed by one of the applications 126 most recently relative to receiving the voice-based query initiation input 110.

The interface module 124 further receives a suggested voice-based action query 155 from suggested voice-based action query system 140. The suggested voice-based action query 155 is in response to the information 130 provided by the interface module 124 and may optionally be based on one or more aspects of the information 130. The interface module 124 provides the suggested voice-based action query 155 to the render/synchronization module 125.

The voice action module 123 provides a suggested voice-based action queries command 137 to the render/synchronization module 125. In response to the command 137, the render/synchronization module 125 presents (e.g., displays) the suggested voice-based action query 155 as a suggestion for the voice query initiated by the voice-based query initiation input 110. In some implementations, the voice action module 123 provides the command 137 based on the voice-based query initiation input 110 being followed by an indication of a need for a suggested voice-based action query. In some of those implementations, an indication of the need for a suggested voice-based action query may include the lack of any spoken input from a user within a threshold amount of time following the user input initiating the voice-based query. For example, in versions of those implementations a suggested voice-based action query may be presented in response to the user not providing any spoken input within four seconds (or other threshold amount of time) of the user input initiating the voice-based query. In some implementations, the command 137 may additionally and/or alternatively be provided in response to other indications of the need for a suggested voice-based action query. For example, other indications may include one or more phrases that can be spoken by the user (e.g., "tell me what I can do"), selection of a user interface element provided for requesting suggested voice-based action queries, and/or detecting of at least a threshold noise level following the voice-based query initiation input 110 (e.g., detecting that the environment is "too loud" to properly process spoken input). In some implementations, the render/synchronization module 125 may present the suggested voice-based action query as a suggestion for the voice query without receiving the command 137.

Figure 4:
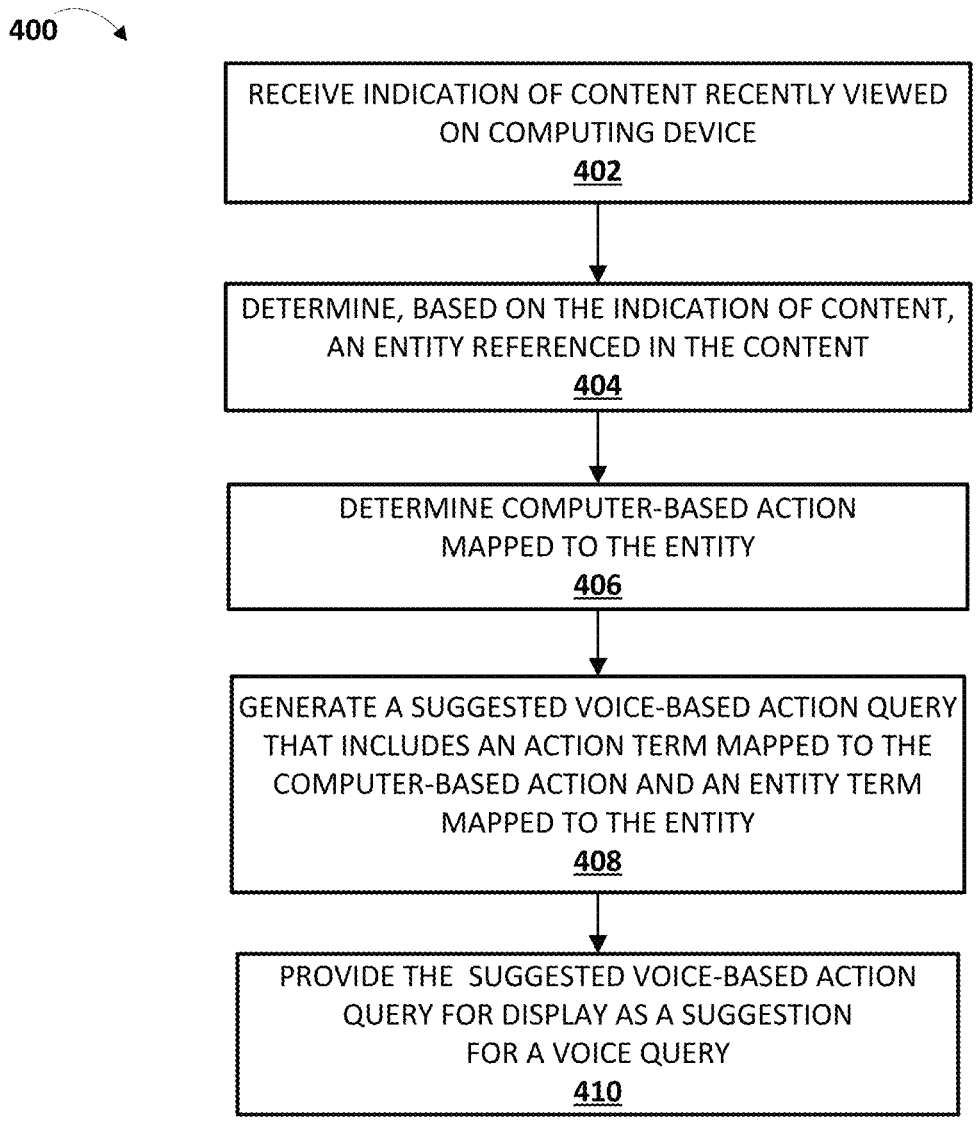
FIG. 4 is a flowchart illustrating an example method of determining, in view of content being accessed on a computing device, at least one suggested voice-based action query for presentation via the computing device.

FIG. 4 is a flowchart illustrating an example method 400 of determining, in view of content being accessed on a computing device, at least one suggested voice-based action query for presentation via the computing device. For convenience, the operations of the flow chart are described with reference to a system that performs the operations. This system may include various components of various computer systems, such as suggested voice-based action query system 140. Moreover, while operations of method 400 are shown in a particular order, this is not meant to be limiting. One or more operations may be reordered, omitted or added.

At block 402, the system receives an indication of content recently viewed on a computing device. For example, the indication of content may include text and properties of the text for content currently being displayed by the computing device. In some implementations, the indication of content may be provided by the computing device in response to input of a user via the computing device to initiate providing of a voice-based query.

At block 404, the system determines, based on the indication of the content, an entity referenced in the content. For example, where the indication of the content includes text and properties of the text, the system may determine a dominant entity associated with the content based on position, format, frequency, and/or other property of the text in the content. For example, certain text may be identified as the dominant entity based on it appearing in the title of the content, in larger font than other text in the content, in a more prominent position than other text in the content, and more frequently than other text in the content.

At block 406, the system determines a computer-based action that can be mapped to the entity. For example, the system may determine at least one computer-based action that is mapped to the entity in the entities and actions database 162. In some implementations, the system may rank and/or filter computer-based actions based on one or more factors such as, for example: strengths of association of the actions to the entity and/or a class of the entity; historical popularity of the actions in general; historical popularity of the actions for the application from which the content originated; whether the actions are performable via one or more applications installed on the computing device; historical popularity of performance of the actions via one or more applications installed on the computing device; etc.

At block 408, the system generates a suggested voice-based action query that includes an action term mapped to the computer-based action and an entity term mapped to the entity. In some of those implementations, the system determines the action term(s) and/or the entity terms based on a preferred language indicated by information received from the computing device.

At block 410, the system provides the suggested voice-based action query for display as a suggestion for a voice query. In some implementations, the system provides the generated one or more suggested voice-based action queries to the computing device for display as a suggestion for a voice query in response to receiving a voice-based query input indication from the computing device. In some of those implementations, the voice-based query input indication is the receiving of the indication of content at block 402 and/or the receiving of other information from the computing device.

Figure 5:
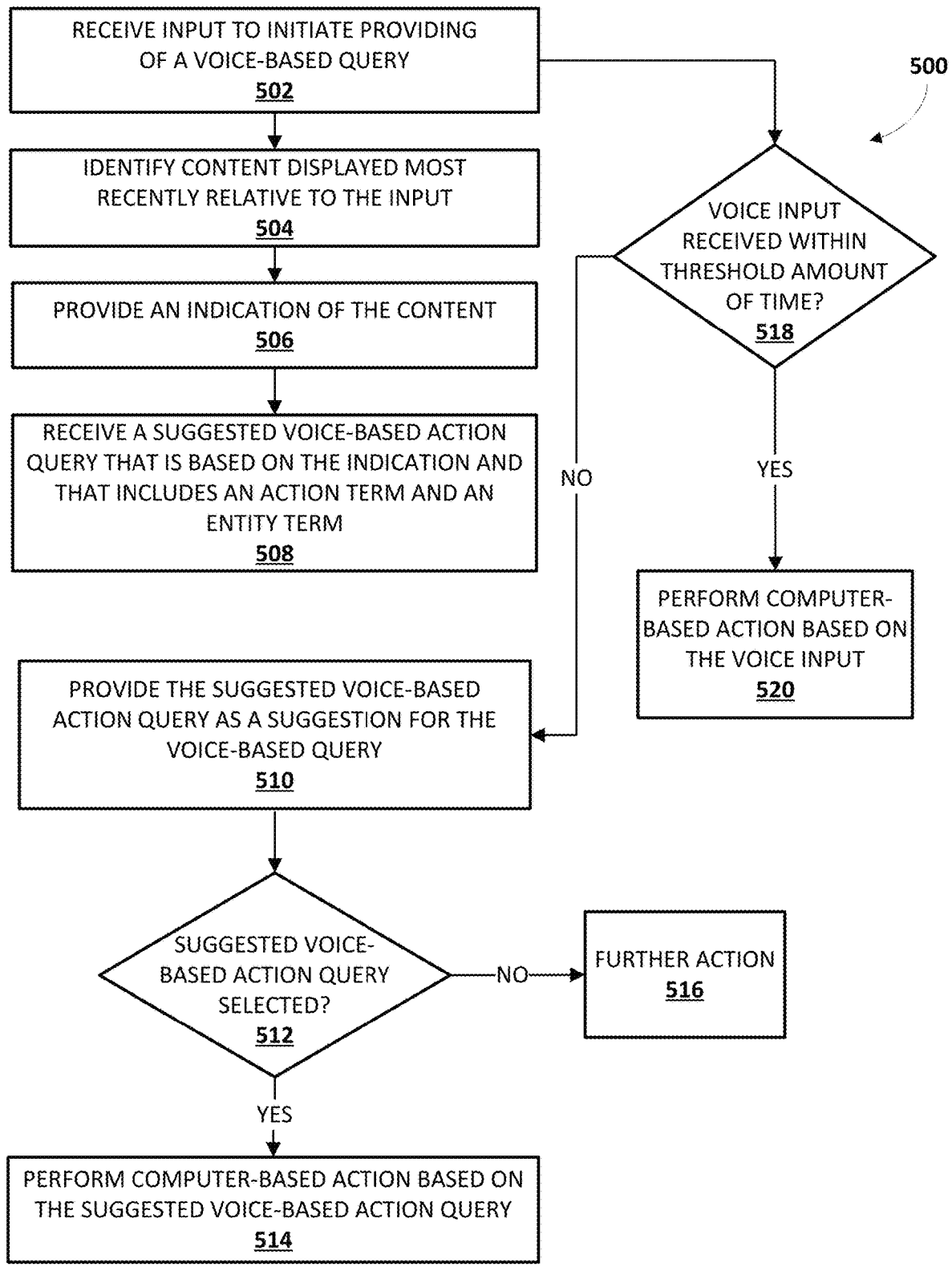
FIG. 5 illustrates an example method of receiving at least one suggested voice-based action query at a computing device and providing the suggested voice-based action query as a suggestion in response to input to initiate providing of a voice-based query.

FIG. 5 illustrates an example method of receiving at least one suggested voice-based action query at a computing device and providing the suggested voice-based action query as a suggestion in response to input to initiate providing of a voice-based query. For convenience, the operations of the flow chart are described with reference to a system that performs the operations. This system may include various components of various computer systems, such as voice query application 122 of computing device 120. Moreover, while operations of method 500 are shown in a particular order, this is not meant to be limiting. One or more operations may be reordered, omitted or added.

At block 502, the system receives input to initiate providing of a voice-based query. The input may include, for example, a user selecting a voice query icon via a graphical user interface, the user speaking a phrase that initiates a voice-based query (e.g., "OK computer"), the user actuating a touch-sensitive hardware element, and/or performing a gesture.

At block 504, the system identifies content displayed most recently relative to the input at block 502. For example, the system may provide an identifier of the content or text, metadata, images, tags applied to image(s), and/or screenshots of the content displayed by the computing device when, or just before, the input was received at block 502.

At block 506, the system provides an indication of the content identified at block 504. For example, the system may provide the indication of the content to suggested voice-based action query system 140.

At block 508, the system receives a suggested voice-based action query that is based on the indication of block 506 and that includes an action term and an entity term. For example, the system may receive a suggested voice-based action query from the voice-based action query system 140 in response to providing the indication of the content (and optionally other information) at block 506.

At block 518, the system determines whether voice input has been received within a threshold amount of time. If the answer is yes, the system proceeds to block 520 and performs a computer-based action based on the received voice input. If the answer is no, the system proceeds to step 510 and provides the suggested voice-based action query as a suggestion for the voice-based query.

At step 512, the system determines whether the suggested voice-based action query has been selected. If the answer is yes, the system proceeds to block 514 and performs a computer-based action based on the suggested voice-based action query. If the answer is no, the system proceeds to block 516 and performs a further action. For example if the user provides input to remove the suggested voice-based action query from the display, the answer is no and the system will respond to the provided input at block 516.

FIG. 6A illustrates an example graphical user interface 680A showing content displayed in an application of a computing device. For example, the graphical user interface 680A may be displayed on a mobile phone computing device. The content is displayed in the graphical user interface 680A by an application of the computing device, such as an application that provides information and reviews for restaurants. The particular content is focused on information and reviews for a fictional restaurant "Up and Down Burger Bar." The graphical user interface 680A also includes graphical interface elements 681, 682, and 683 that may each, when actuated, cause one or more actions to be performed. Additional and/or alternative graphical and/or other (e.g., mechanical) interface elements may be provided.

Figure 6B:
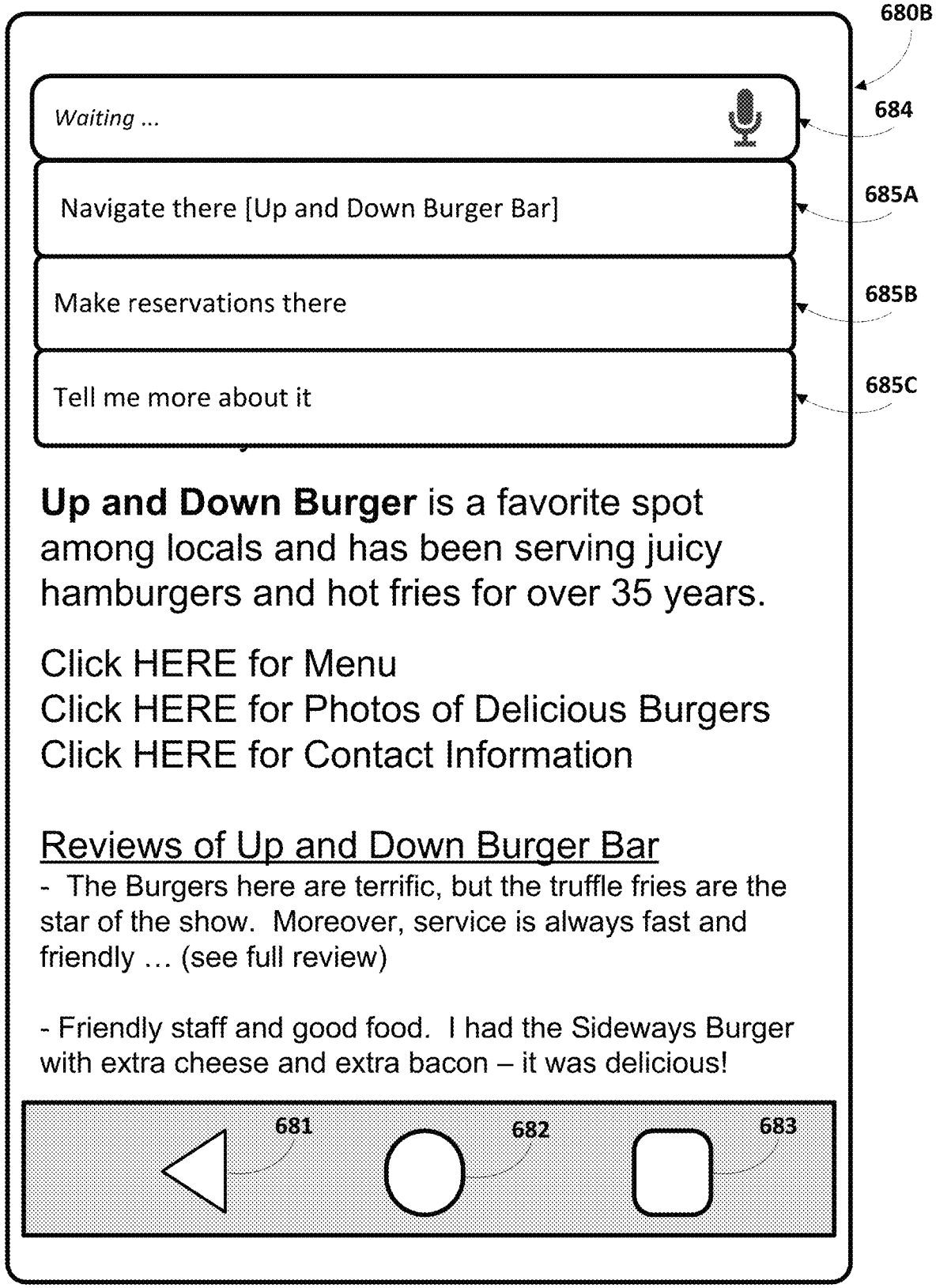
FIG. 6B illustrates an example graphical user interface for displaying suggested voice-based action queries that are generated based on the content of FIG. 6A.

FIG. 6B illustrates an example graphical user interface 680B for displaying suggested voice-based action queries 685A-C that are generated based on the content of FIG. 6A. FIG. 6B illustrates an example of the user, while provided with the display of FIG. 6A, providing a voice-based query initiation input. The voice-based query initiation input may be, for example, speaking one or more terms or selecting an interface element (e.g., actuating one or more of elements 681-683 in a certain manner or actuating a mechanical interface element). Providing the voice-based query initiation input caused a voice query interface 684 to be displayed with the content of FIG. 6A. The voice query interface 684 includes an icon of a microphone to indicate a voice query and also includes the text "Waiting . . . " to indicate to the user that the computing device is awaiting spoken input from the user. The suggested voice-based action queries 685A-C are displayed below the voice query interface 684 as individual "cards" that may be selected (e.g., "tapped" or spoken) by the user. The suggested voice-based action queries 685A-C are based on the content of FIG. 6A and may be determined, for example, as described herein with respect to suggested voice-based action query system 140, FIG. 2, and/or FIG. 4. For example, a screenshot and/or text from FIG. 6A may have been provided as the indication of content and the suggested voice-based action queries 685A-C received in response. It is noted that suggested voice-based action query 685A is provided with an annotation "[Up and Down Burger Bar]" to provide the user an indication that speaking "Navigate there" or tapping the suggested voice-based action query 685A will result in a computer-based action of providing navigation directions to "Up and Down Burger Bar".

Much of the content of FIG. 6A is still displayed in FIG. 6B, with other of the content being "hidden" under the voice query interface 684 and the voice-based action queries 685A-C. In some implementations, the voice query interface 684 and/or one or more of the voice-based action queries 685A-C may be at least partially transparent to enable viewing of the content that is "hidden" in FIG. 6B.

As described herein, in some implementations the suggested voice-based action queries 685A-C may not have been displayed in the graphical user interface 680B until identification of a need for a suggested voice-based action query following the voice-based query initiation input. For example, the voice query interface 684 may have been initially displayed without the suggested voice-based action queries 685A-C and the suggested voice-based action queries 685A-C displayed only upon determining a lack of any spoken input from a user within a threshold amount of time following the user input initiating the voice-based query. Also, for example, the voice query interface 684 may have been initially displayed without the suggested voice-based action queries 685A-C and the suggested voice-based action queries 685A-C displayed only upon receiving specific spoken input requesting suggestions and/or determining that an ambient noise level is greater than a threshold noise level for receiving and accurately parsing spoken input.

Figure 6C:
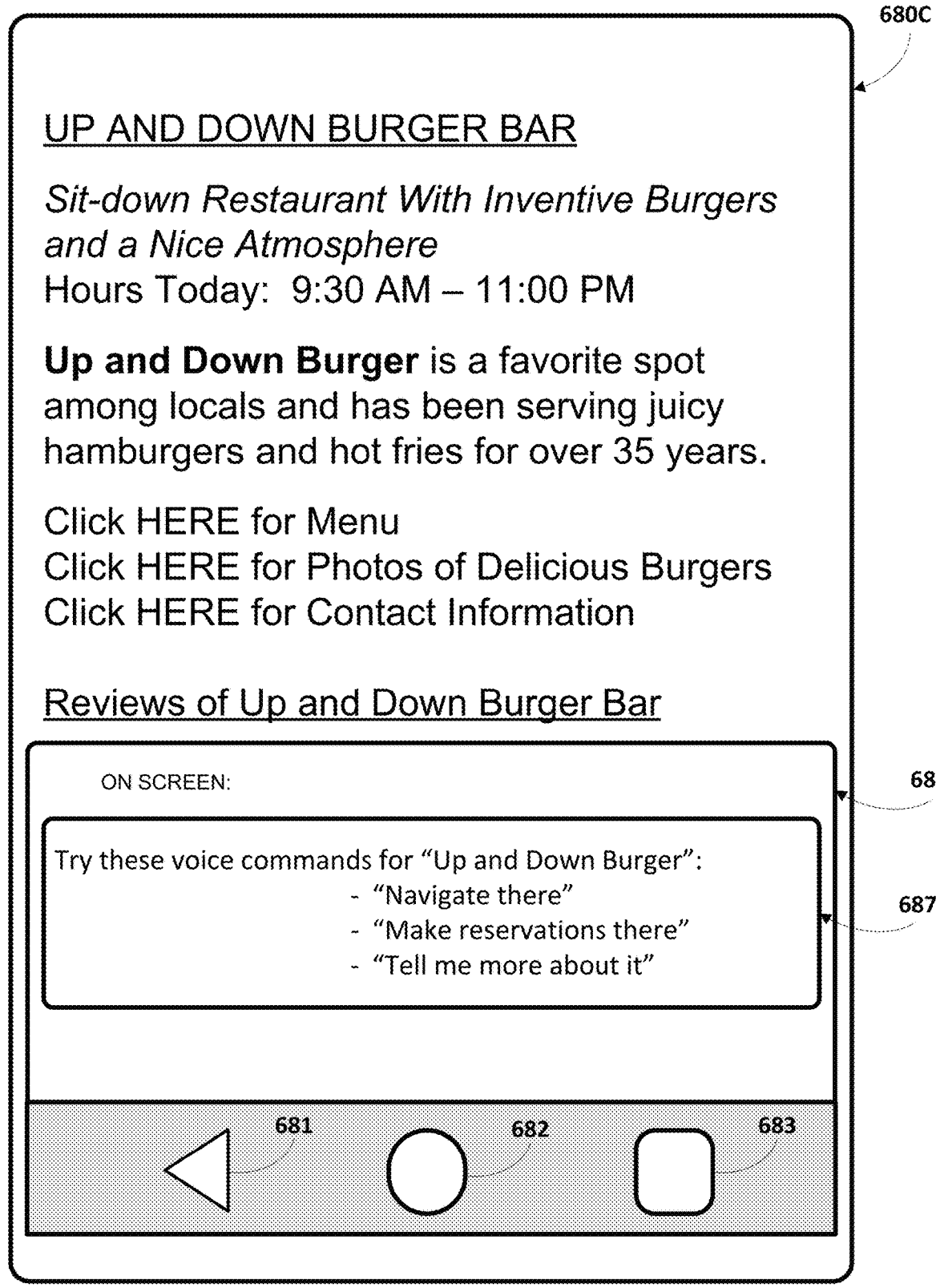
FIG. 6C illustrates another example graphical user interface for displaying suggested voice-based action queries that are generated based on the content of FIG. 6A.

FIG. 6C illustrates an example graphical user interface 680C for displaying suggested voice-based action queries "Navigate there", "Make reservations there", and "Tell me more about it" that are generated based on the content of FIG. 6A. The suggested voice-based action queries of FIG. 6C are displayed in a card 687 based on the content of FIG. 6A and may be determined, for example, as described herein with respect to suggested voice-based action query system 140, FIG. 2, and/or FIG. 4. For example, a screenshot and/or text from FIG. 6A may have been provided as the indication of content and the suggested voice-based action queries received in response. The card 687 is displayed in an interface element 686 that shows (e.g., based on the phrase "ON SCREEN:") that the card 687 (and optionally other non-displayed cards) is particularly tailored to the content of FIG. 6A (which remains partially displayed in FIG. 6C).

FIG. 6C illustrates an example of the user, while provided with the display of FIG. 6A, providing a request for suggested voice-based query suggestions related to content on the screen (without necessarily providing a voice-based query initiation input). For example, the request for suggested voice-based query suggestions may be "touching" graphical interface element 682 and "swiping up" and/or speaking one or more terms. Providing the request for suggested voice-based query suggestions caused the interface element 686 and the card 687 to be displayed over portions of the content of FIG. 6A. Selection of one of the suggested voice-based action queries of FIG. 6C (by "tapping" or speaking (optionally after a voice-based query initiation input)) will cause the computing device to initiate performance of a computer-based action based on the selected voice-based action query.

Much of the content of FIG. 6A is still displayed in FIG. 6C, with other of the content being "hidden" under the interface element 686 and the card 687. In some implementations, the interface element 686 and/or the card 687 may be at least partially transparent to enable viewing of the content that is "hidden" in FIG. 6C.

Figure 7A:
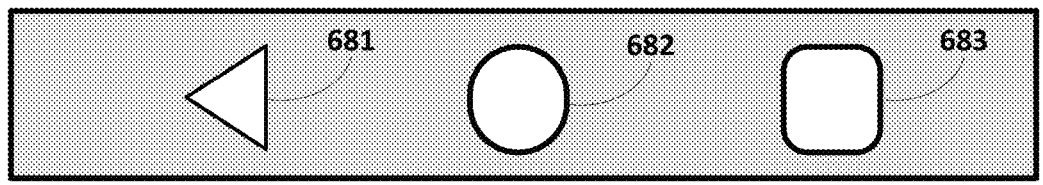
FIG. 7A illustrates another example graphical user interface showing content displayed in an application of a computing device.

FIG. 7A illustrates an example graphical user interface 780A showing content displayed in an application of a computing device. For example, the graphical user interface 780A may be displayed in an instant messaging application of a mobile phone computing device. The particular content is a conversation between a user of the mobile phone and another user "Bob". Bob has asked the user if he wants to head to Up and Down Burger Bar for dinner. The graphical user interface 780A also includes graphical interface elements 681, 682, and 683 that may each, when actuated, cause one or more actions to be performed.

Figure 7B:
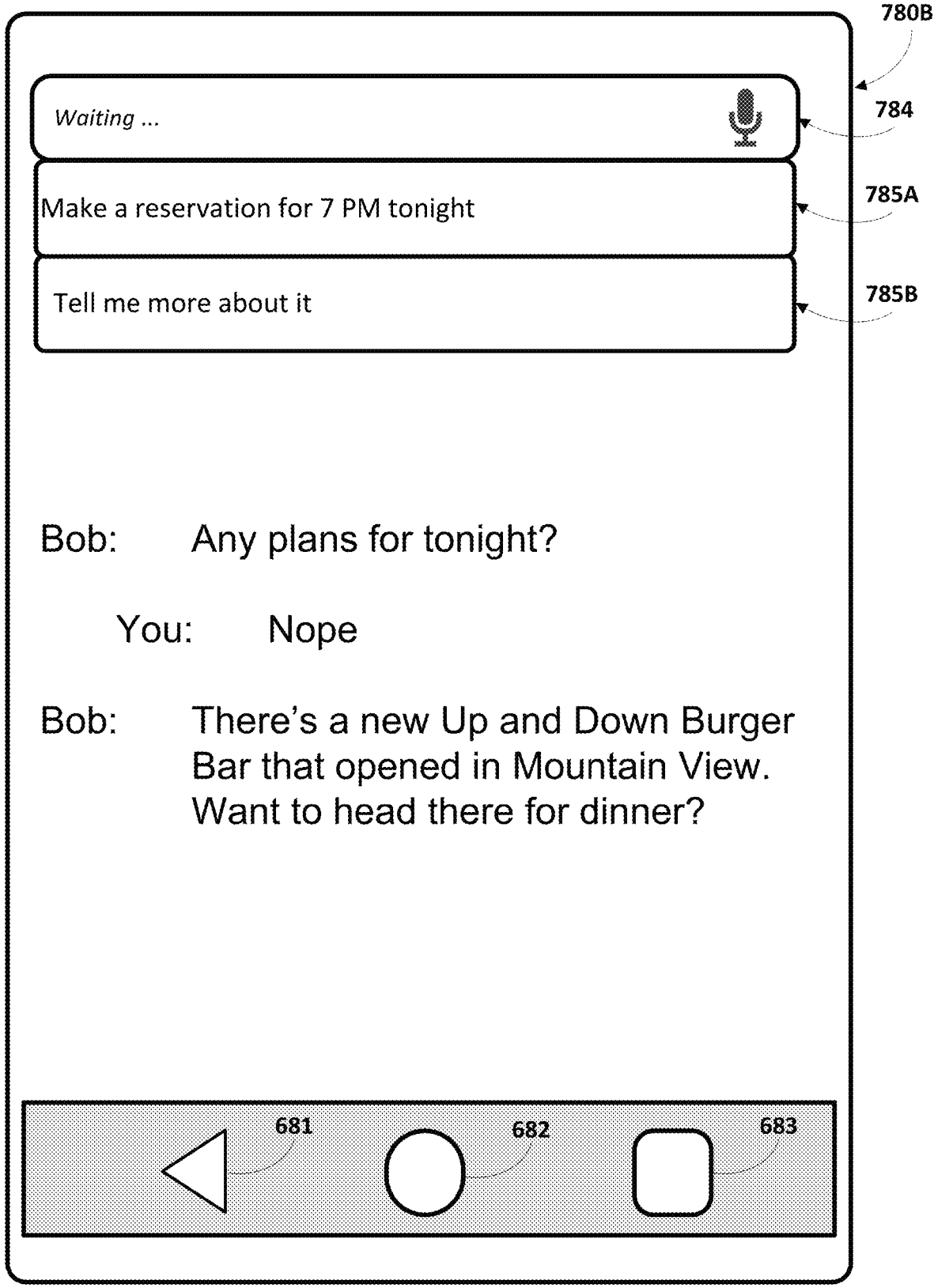
FIG. 7B illustrates an example graphical user interface for displaying suggested voice-based action queries that are generated based on the content of FIG. 7A.

FIG. 7B illustrates an example graphical user interface 780B for displaying suggested voice-based action queries 785A and 785B that are generated based on the content of FIG. 7A. FIG. 7B illustrates an example of the user, while provided with the display of FIG. 7A, providing a voice-based query initiation input. The voice-based query initiation input may be, for example, speaking one or more terms or selecting an interface element (e.g., actuating one or more of elements 681-683 in a certain manner or actuating a mechanical interface element). Providing the voice-based query initiation input caused a voice query interface 784 to be displayed with the content of FIG. 7A. The voice query interface 784 includes an icon of a microphone to indicate a voice query and also includes the text "Waiting . . . " to indicate to the user that the computing device is awaiting spoken input from the user. The suggested voice-based action queries 785A and 785B are displayed below the voice query interface 784 as individual "cards" that may be selected (e.g., "tapped" or spoken) by the user. The suggested voice-based action queries 785A and 785B are based on the content of FIG. 7A and may be determined, for example, as described herein with respect to suggested voice-based action query system 140, FIG. 2, and/or FIG. 4. For example, a screenshot and/or text from FIG. 7A may have been provided as the indication of content and the suggested voice-based action queries 785A and 785B received in response. It is noted that suggested voice-based action query 785A is provided with a suggested time of "7 PM" for making a reservation. The suggested time may be determined based on the context of FIG. 7A ("dinner"), past user reservation history, and/or arbitrarily to provide the user an indication that spoken input can be utilized to make a reservation for "Up and Down Burger Bar" at a desired time.

Figure 8:
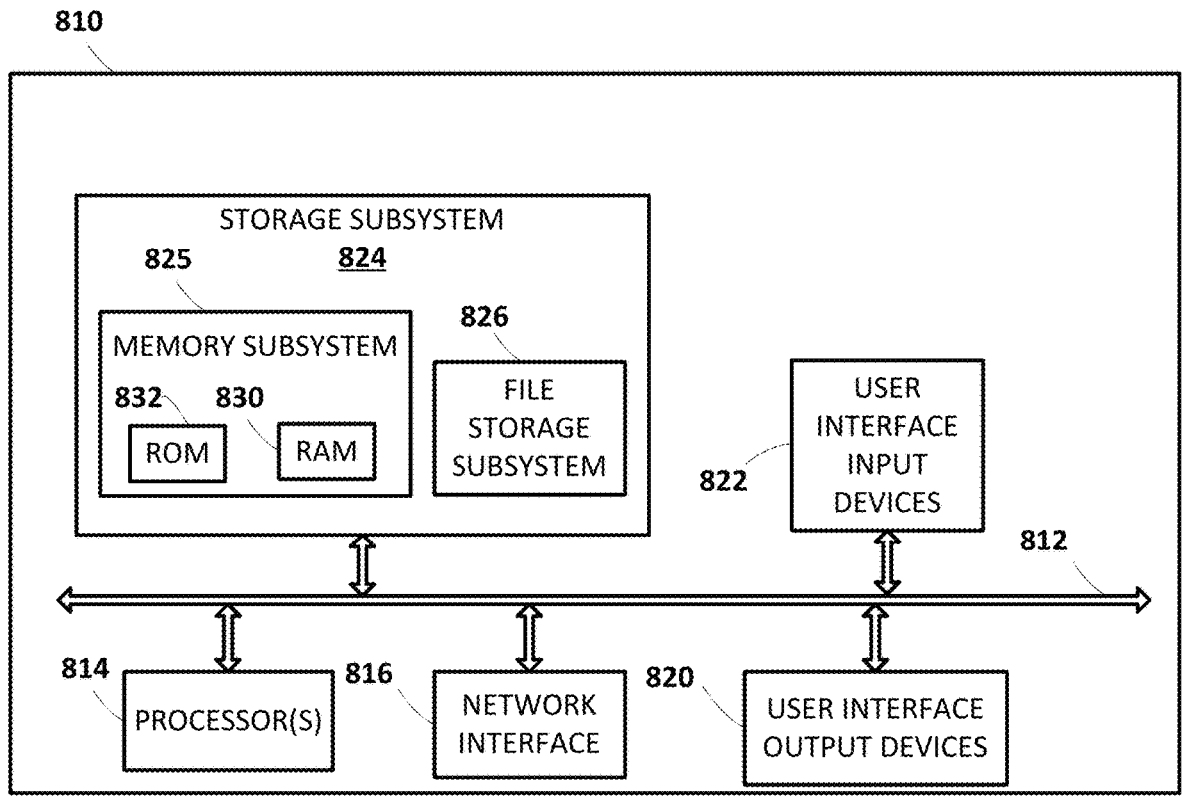
FIG. 8 illustrates an example architecture of a computing device.

FIG. 8 is a block diagram of an example computing device 810 that may optionally be utilized to perform one or more aspects of techniques described herein. In some implementations, computing device 120 and/or suggested voice-based action query system 140 may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIGS. 3 and/or 4.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
generating, based on a first application being installed on a computing device of a user, a first voice-based action query that can be spoken to initiate performance of a first computer-based action mapped to the first application;
generating, based on a second application being installed on the computing device, a second voice-based action query that can be spoken to initiate performance of a second computer-based action mapped to the second application;
receiving an input to initiate providing of a voice-based action query via the computing device, wherein the input to initiate providing of a voice-based query is a spoken phrase, an actuation of a touch-sensitive hardware element of the computing device, or performing a gesture in view of a camera of the computing device;
in response to receiving the input to initiate providing of the voice-based action query and in response to detecting that no spoken input has been received within a threshold amount of time following the input of the user to initiate providing of the voice-based action query:
providing the first voice-based action query for presentation to the user, and
providing the second voice-based action query for presentation to the user; and
in response to the user speaking the provided first voice-based action query:
causing performance of the first computer-based action.

2. The method of claim 1, wherein generating the first voice-based action query is further based on a version of the first application that is installed on the computing device, and further based on the first computer-based action being mapped to the version of the first application.

3. The method of claim 1, wherein generating the first voice-based action query is further based on a version of the first application that is installed on the computing device, and further based on the first computer-based action being mapped to the version of the first application.

4. The method of claim 1, wherein the input to initiate providing of a voice-based query is the spoken phrase.

5. The method of claim 1,
wherein the input to initiate providing of a voice-based query is the touch actuation of the touch-sensitive hardware element of the computing device.

6. The method of claim 1, further comprising:
in response to receiving the input to initiate providing of the voice-based action query:
monitoring for voice input; and
providing, while monitoring for voice input, a visual indication of awaiting voice input.

7. The method of claim 1, where the first voice-based action query is further selectable, through touch input, to cause performance of the first computer-based action.

8. A computing device, comprising:
one or more processors; and
memory operably coupled with the one or more processors, wherein the memory stores instructions that, in response to execution of the instructions by one or more processors, cause the one or more processors to:
generate, based on a first application being installed on the computing device, a first voice-based action query that can be spoken to initiate performance of a first computer-based action mapped to the first application;
generate, based on a second application being installed on the computing device, a second voice-based action query that can be spoken to initiate performance of a second computer-based action mapped to the second application;
receive, at the computing device, an input to initiate providing of a voice-based action query via the computing device, wherein the input to initiate providing of a voice-based query is a spoken phrase, an actuation of a touch-sensitive hardware element of the computing device, or performing a gesture in view of a camera of the computing device;
in response to receiving the input to initiate providing of the voice-based action query and in response to detecting that no spoken input has been received within a threshold amount of time following the input of the user to initiate providing of the voice-based action query:
provide the first voice-based action query for presentation at a display of the computing device, and
provide the second voice-based action query for presentation at the display.

9. The computing device of claim 8, wherein execution of the instructions further cause one or more of the processors to:
in response to a user of the computing device speaking the provided first voice-based action query:
cause performance of the first computer-based action.

10. The computing device of claim 8, wherein the first voice-based action query is selectable and wherein execution of the instructions further cause one or more of the processors to:
in response to receiving a touch selection, at the computing device, of the first voice-based action query after it is provided:
cause performance of the first computer-based action.

11. The computing device of claim 8, wherein generating the first voice-based action query is further based on a version of the first application that is installed on the computing device, and further based on the first computer-based action being mapped to the version of the first application.

12. The computing device of claim 8, wherein generating the first voice-based action query is further based on a version of the first application that is installed on the computing device, and further based on the first computer-based action being mapped to the version of the first application.

13. The computing device of claim 8, wherein the input to initiate providing of a voice-based query is the spoken phrase.

14. The computing device of claim 8,
wherein the input to initiate providing of a voice-based query is the gesture in view of the camera of the computing device.

15. The computing device of claim 8, wherein execution of the instructions further cause one or more of the processors to:
in response to receiving the input to initiate providing of the voice-based action query:
monitor for voice input; and
while monitoring for voice input, provide, for presentation at the display, an indication of awaiting voice input.

* * * * *